US007587332B2

(12) United States Patent
Andrews et al.

(10) Patent No.: US 7,587,332 B2
(45) Date of Patent: Sep. 8, 2009

(54) DIRECTED AUTOLOAD OF CONTACTLESS STORED VALUE CARD WITHIN A TRANSPORTATION SYSTEM

(75) Inventors: David W. Andrews, Leesburg, VA (US); Douglas P. Young, San Diego, CA (US); Ronald J. Oleksa, Sr., Winchester, VA (US); Roger H. Kuite, San Diego, CA (US); Robert T. Hughes, Gainesville, VA (US)

(73) Assignee: Cubic Corporation, San Diego, CA (US)

( * ) Notice: Subject to any disclaimer, the term of this patent is extended or adjusted under 35 U.S.C. 154(b) by 498 days.

(21) Appl. No.: 11/201,836

(22) Filed: Aug. 10, 2005

(65) Prior Publication Data
US 2006/0218064 A1 Sep. 28, 2006

Related U.S. Application Data

(60) Provisional application No. 60/664,918, filed on Mar. 23, 2005.

(51) Int. Cl.
*G06Q 40/00* (2006.01)
(52) U.S. Cl. ............................. 705/13; 705/16; 705/61
(58) Field of Classification Search ........................ None
See application file for complete search history.

(56) References Cited

U.S. PATENT DOCUMENTS 6,018,717 A * 1/2000 Lee et al. ..................... 705/13

6,655,587 B2 * 12/2003 Andrews et al. ............ 235/383

(Continued)

FOREIGN PATENT DOCUMENTS

WO WO02/067203 A 8/2002

(Continued)

OTHER PUBLICATIONS

Cubic Signs Contract to Deliver US$95 Million Smart Card-Based Ticketing System and Regional Services to Brisbane, Australia; Business Wire, pp. 1-3, Jul. 18, 2003.*

(Continued)

*Primary Examiner*—Alexander Kalinowski
*Assistant Examiner*—Gregory Johnson
(74) *Attorney, Agent, or Firm*—Townsend and Townsend and Crew, LLP

(57) ABSTRACT

According to the invention, a method for processing credit for a contactless smart card is disclosed. In one step, the contactless smart card is uniquely recognized at a first location. The contactless smart card is capable of recording the credit or debit that affects a stored value associated with the contactless smart card. A notice that a credit or a debit is destined for the contactless smart card is received. It is determined and reported that the credit or debit was not properly recorded to affect the stored value on the contactless smart card. The reporting is away from the first location. An indication that the credit or debit should be loaded if the contactless smart card is encountered at the second location is received. The contactless smart card is uniquely recognized at the second location. The credit or debit is automatically loaded onto the contactless smart card at the second location to affect the stored value of the contactless smart card.

25 Claims, 7 Drawing Sheets

U.S. PATENT DOCUMENTS

| | | | |
|---|---|---|---|
| 6,732,922 B2* | 5/2004 | Lindgren et al. | 235/381 |
| 7,108,176 B2* | 9/2006 | Andrews et al. | 235/382 |
| 7,213,755 B2* | 5/2007 | Newsome et al. | 235/384 |
| 7,330,714 B2* | 2/2008 | Rosenberg | 705/2 |
| 2003/0019927 A1 | 1/2003 | Lindgren et al. | |
| 2004/0054595 A1* | 3/2004 | Din | 705/21 |
| 2004/0133510 A1* | 7/2004 | Honjo et al. | 705/39 |
| 2006/0157563 A1* | 7/2006 | Marshall | 235/382 |

FOREIGN PATENT DOCUMENTS

WO     WO02/093307 A     11/2002

OTHER PUBLICATIONS

The contactless wave; Davis, Donald; Card Technology; pp. 1-8, Jan. 2003.*

The ABC's of Contactless Smart Cards (Number of contactless smart cards is expected to rise from 36 mil in 1999 to 430 mil in 2005; transit represents two-thirds of the cards' use); Card Technology, pp. 1-7, May 2000.*

Cubic Announces "Nextfare Solution Suite" 21st Century Smart Card Breakthroughs; Business Wire, pp. 1-2; May 1, 2000.*

Bay Area Commute Becomes Smarter via Express Plastic (San Francisco plans to introduce a version of a smart card transit system called TransLink; when fully deployed, over 1 mil riders expected to use the system in 2002); Card Marketing, pp. 1-3, Jul. 1999.*

New York Transit System Rides Success of MetroCard (Of the New York Metropolitan Transportation Authority's transit system customers, about 70% use the MetroCard vs 16% in Mar. 1997); Card Marketing, pp. 1-4, Jun. 1998.*

* cited by examiner

DIRECTED AUTOLOAD OF CONTACTLESS STORED VALUE CARD WITHIN A TRANSPORTATION SYSTEM

This application claims the benefit of and is a non-provisional of U.S. Provisional Application Ser. No. 60/664,918 filed on Mar. 23, 2005, which is incorporated by reference in its entirety for all purposes.

BACKGROUND OF THE DISCLOSURE

This disclosure relates in general to stored value cards and, more specifically, but not by way of limitation, to contactless fare cards used in transit systems.

Transit systems use magnetic cards, smart cards and tokens to gain entry to the system. Stored value cards have an amount of credit associated with them. Some of these cards store the amount of credit available on the card in a magnetic strip, RFID tag, or a semiconductor chip. The interface to a fare card with semiconductor storage, i.e., a smart card, can be through contact with metal pads on the card or RFID. Smart cards that communicate with wireless RFID are called contactless smart cards.

Contactless smart cards require a user to place their card in close proximity to a RFID reader/writer. The reader identifies the contactless smart card. After additional credit is arranged, the writer adds the credit to the contactless smart card. This process may require the user to place their card proximate to the reader/writer twice. Where the second encounter doesn't occur or there is some other problem writing information to the contactless smart card, the credit may not be properly applied even though paid for.

BRIEF DESCRIPTION OF THE DRAWINGS

The present disclosure is described in conjunction with the appended figures.

Figure 1:
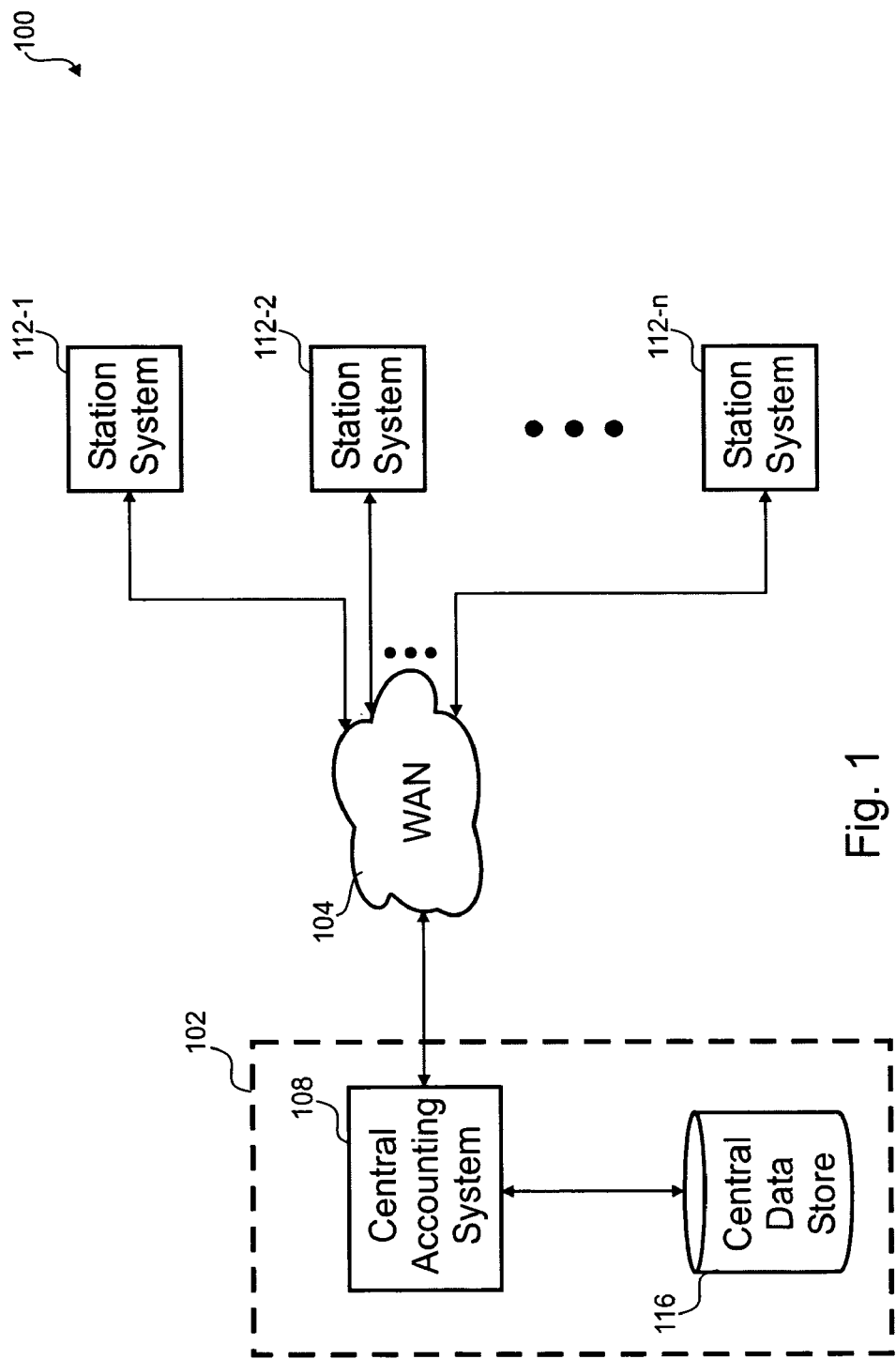
FIG. 1 is a block diagram of an embodiment of a transit fare system.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE PREFERRED EMBODIMENT

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment or computer-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Referring first to FIG. 1, a block diagram of an embodiment of a transit fare system 100 is shown. This embodiment is in the context of the transit fare system 100, which is a closed system where fare cards have a stored value associated with the card. In one embodiment, a contactless smart card is used for the fare card, but other embodiments could use serialized magnetic stripe cards, digital tokens, RFID tags, cell phone payment, smart cards with contacts, or any other portable device or card that can store value. The user can add an amount or credit to the far card to allow further use in the transit fare system 100. The credits, debits and stored value can include a monetary credit, a usage credit and/or a usage period. For example, contactless smart card could hold $25, an 11 trip transit pass, and/or a month long transit pass. A number of station systems 112 are distributed across the transit fare system 100 and generally correspond to the transit stations where the fare card might be used.

There is a central control system 102 that communicates with the various station systems 112 using a wide area network (WAN) 104 that may be public or private. The WAN 104 could be packet switched or circuit switched connections using telephone lines, coaxial cable, optical fiber, wireless communication, satellite links, and/or other mechanisms for communication. Communication between the station systems 112 and the central control system 102 may be in real time or periodic.

The central control system 102 could have many more components, but only the components related to accounting for walkaways are shown. A walkaway occurs when the fare card has an unconfirmed or failed load of stored value. The stored value represented on the fare card is authenticated by the card such that it can be trusted without necessarily referencing a remote location to check the stored value to complete a transaction. Although this embodiment is a contactless smart card, other embodiments could have contacts or be of other configurations that allow trusting the information on the fare card without outside information. Some embodiments could store the stored value in a secure manner using a digital token or authenticated stored data that is magnetically encoded onto the fare card.

In this embodiment, a central accounting system 108 and a central data store 116 are shown for the central control system. The central accounting system receives periodic reports upon how credits or debits are being processed throughout the system 100. When a walk-away situation occurs, the station system 112 communicates the problem to the central accounting system 108. Table I shows an example of a walkaway message resulting from a credit or debit not being properly recorded on a fare card. In this example, the user began a transaction to load a $25.00 credit and paid with $40.00. The credit was not loaded onto the fare card and the change was not received. At another ticket vending machine, the pending credit can be loaded and change can be loaded to the stored value purse.

TABLE I

Walkaway Message Example

| Field | Example |
| --- | --- |
| Machine Number | 34sd82k |
| Transaction Date | Jul. 21, 2008 |
| Transaction Time | 21:32:05 |
| Fare Card Serial Number | 23490782 |
| Transaction Type | Fare Load |
| Change Due | $15.00 |
| Amount Not Loaded | $25.00 |

A walkaway may occur when the user pays for credit, but leaves the machine before letting the fare card update with the load information. In the example of Table I, a ticket vending machine (TVM), serial number 34sd82k, failed to load fare card serial number 23490782. The walkway occurred on Jul. 21, 2008 at 9:32 p.m. The transaction type was a fare load of $25 credit to an existing fare card. This type of walk away could have occurred because the user didn't place the fare card in a position to allow writing the credit to the properly recognized fare card. The TVM has a protocol of interaction with the fare card that allows reading back the information written to the fare card. In some cases, the read-back fails, but the card may have properly recorded the change in the stored value associated with the card. The stored value can be used for transportation or purchase of another transportation product. In some embodiments, the TVM may have the ability to offer the credit in cash as an alternative to adding it as stored value.

In another embodiment shown in Table II, a debit to the fare card could not be verified as being recorded. A turnstile (i.e., machine number 99k8645a) may have read the fare card (serial number 23489202) and attempted to write to the card, but a malfunction caused the read-back of the fare card to fail. Accordingly, a $2 debit may not have been properly applied to the fare card.

TABLE II

Walkaway Message Example

| Field | Example |
| --- | --- |
| Machine Number | 99k8645a |
| Transaction Date | Sep. 28, 2006 |
| Transaction Time | 00:02:05 |
| Fare Card Serial Number | 23489202 |
| Transaction Type | Fare Debit |
| Change Due | 0 |
| Amount Not Loaded | −$2.00 |

The central accounting system 108 receives all these walkaway messages and updates a record for each fare card in the central data store 116. Subsequent interaction with the fare card that has a walkaway message results in the transit fare system 100 loading the missing credit or debit onto the fare card. Loading of the fare cards due to a walkaway message, Internet automatic loading, promotional credit, or other credits accrued before the fare card can be written.

Loads initiated where the fare card is not present are called directed autoloads. The central accounting system 108 searches the central data store 116 for any pending loads and distributes directed autoload lists to the station systems 112 such that the credit can be automatically loaded at the next encounter. Initially, the station systems 112 chosen may be those most frequented by the user, but after a two-day wait without loading the value, this embodiment distributes the directed autoload entry system wide.

Other embodiments could have multiple stages where the directed autoload entry is disseminated more and more widely. The period between the wider levels of dissemination could be any amount of time. In another example, the most frequented TVMs and turnstiles include the directed autoload entry for the first day. On the second day, the whole stations associated with those frequented machines are updated with the directed autoload entry. If not loaded at the end of the second day, all stations ever used by the particular fare card and/or user are updated. If still not loaded, the whole system receives the directed autoload entry on the fourth day. In this embodiment, the central accounting system moderates the dissemination of directed autoload entries in the various directed autoload lists for the various machines in the system 100 that can affect the stored value of the fare cards.

Figure 2:
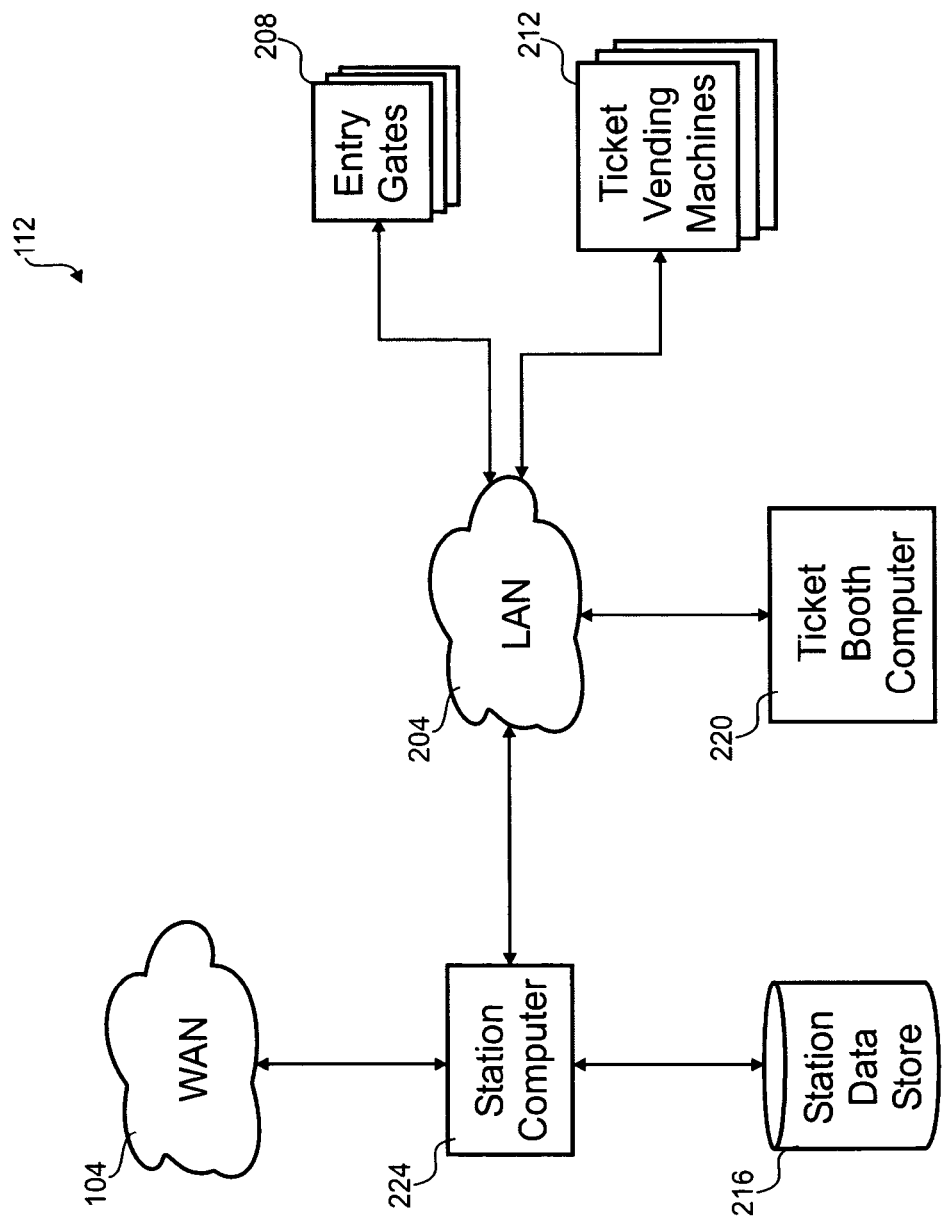
FIG. 2 is a block diagram of an embodiment of a transit station system.

With reference to FIG. 2, a block diagram of an embodiment of a transit station system 112 is shown. Various transit stations may have some or all of the components shown in the block diagram. A local area network (LAN) 204 couples the various systems together and could include point-to-point connections, packet switched connections, wireless connections, and/or other networking techniques. A station computer 224 is coupled to the WAN 104 to allow communication with the central accounting system 108.

A station data store 216 stores various information used by the station system 112. Walkaway messages and directed autoload lists are stored in the station data store 216. A ticket booth computer 220, entry gates 208, and TVMs 212 all communicate with the central accounting system 108 through the station computer 224. Directed autoload lists are maintained by each of the entry gates 208 and TVMs 212 such that loading can occur without referring to the LAN 204 for more information. Other embodiments store the directed autoload lists in the station data store 216 for reference during a transaction. Some embodiments even refer back to the central accounting system 108 for directed autoload information during a transaction.

In this embodiment, the entry gates 208 and TVMs 212 can credit or debit the fare card. Where writing of a change in the stored value is not completed or cannot be verified, a walkaway message is generated. Further, fare cards read by the entry gates 208 and TVMs 212 attempt to write any missing credit or debit by referring the directed autoload list. Where a directed autoload entry is loaded onto the appropriate fare card, the station computer 224 is notified along with the central accounting system 108. The directed autoload lists that include that entry are updated to remove the fulfilled entry.

Should an entry gate 208 or TVM 212 encounter a fare card after it is updated by another machine, a further adjustment would not be made. The entry gate 208 or TVM 212 checks to see if the autoload has been performed by another machine before any autoload.

Figure 3A:
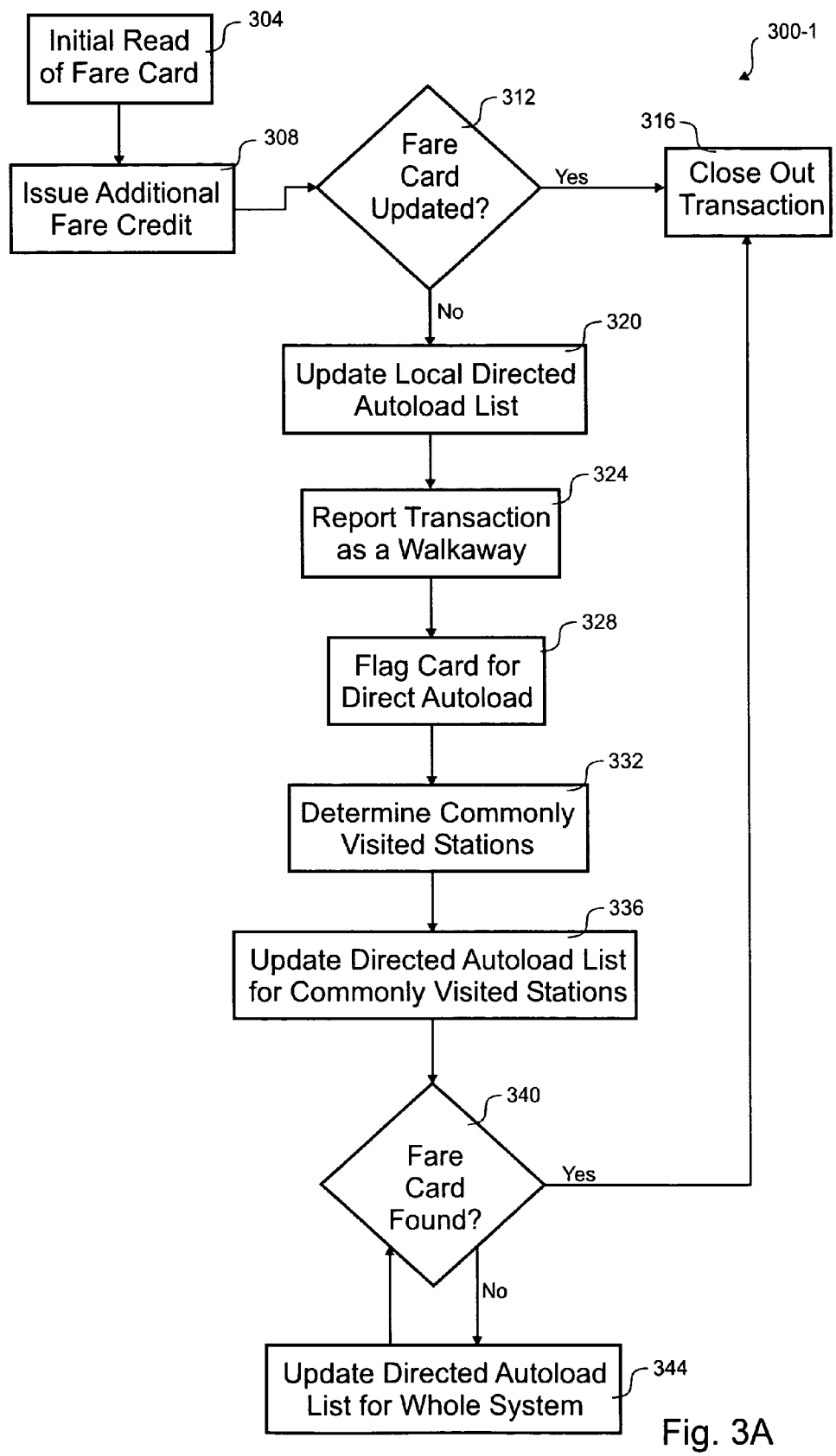
FIGS. 3A-3D are flow diagrams of embodiments of a process for fixing an interrupted fare load.

Referring next to FIG. 3A, a flow diagrams of an embodiment of a process 300-1 for fixing an interrupted fare load is shown. A transaction has been initiated at a entry gate, ticket booth or TVM. The depicted portion of the process 300-1 then begins in step 304 where there is an initial read of the fare card. Gathered from the card are a unique serial number identifying the card, a current stored value and any other information. Something causes the stored value to change on the card, for example, use of the fare card, purchase of additional credit, and/or a directed autoload. In step 308, the additional fare credit or debit is issued against the fare card.

For a variety of reasons, the additional fare credit or debit issued against a fare card may not be properly loaded to the card. In one example, an error in the writing process to a magnetic stripe is detected. Another problem that can happen is where the user walks away from the TVM before his or her contactless smart card is presented a second time to write the stored value to the embedded microchip. In yet another example, the stored value is written, but a confirming read of the stored value fails or cannot be completed. In step 312, it is determined if the fare card is confirmed to have received the write of the additional credit or debit. Where the credit or debit is confirmed, the transaction is closed out in step 316.

If writing of the stored value cannot be confirmed in step 312, a "walkaway" situation is said to have occurred and processing continues to step 320. The local directed autoload list is updated with a new entry corresponding to the unloaded value in step 320. Should the user return to that machine 208, 212 another load can be attempted after the directed autoload list is updated. In step 324, the station computer 224 is notified with a walkaway message. That walkaway message is relayed to the central control system 102 at some point, which may be in real time or stored for forwarding later during a periodic communication.

After receiving the walkaway message, the central accounting system 108 flags the card for a direct autoload in step 328 and updates the central data store 116 accordingly. In step 332, the commonly visited stations of the fare card and/or user are determined by referring to historical information in the central data store 116. A new directed autoload entry is added to the various directed autoload lists for the commonly visited stations and/or machines 208, 212 in step 336. Those updated directed autoload lists are distributed by the central control system 102 to the various station systems 112. The station systems 112 in turn distribute the autoload lists to the individual machines 208, 212 that can perform the directed autoload.

Where one of the machines 208, 212 with the directed autoload entry for the fare card finds the fare card in step 340, the pending credit or debit is loaded and confirmed before closing the transaction in step 316. If the fare card is not found or cannot be successfully written, processing will eventually go to step 344, where the whole system 100 is updated with the directed autoload entry. In this embodiment, the commonly used stations try to find the fare card for two days, before a system-wide search would automatically begin. When the fare card is found in the system-wide search, the directed autoload transaction is closed out with a message to the central control system 102.

This embodiment will continue searching until the fare card expires or the directed autoload directive expires, but other embodiments will close out the directed autoload process after a period of time even if the fare card is not expired. The missing credit or debit can be loaded after the directed autoload process stops, but that process is not automatic in one embodiment.

Figure 3B:
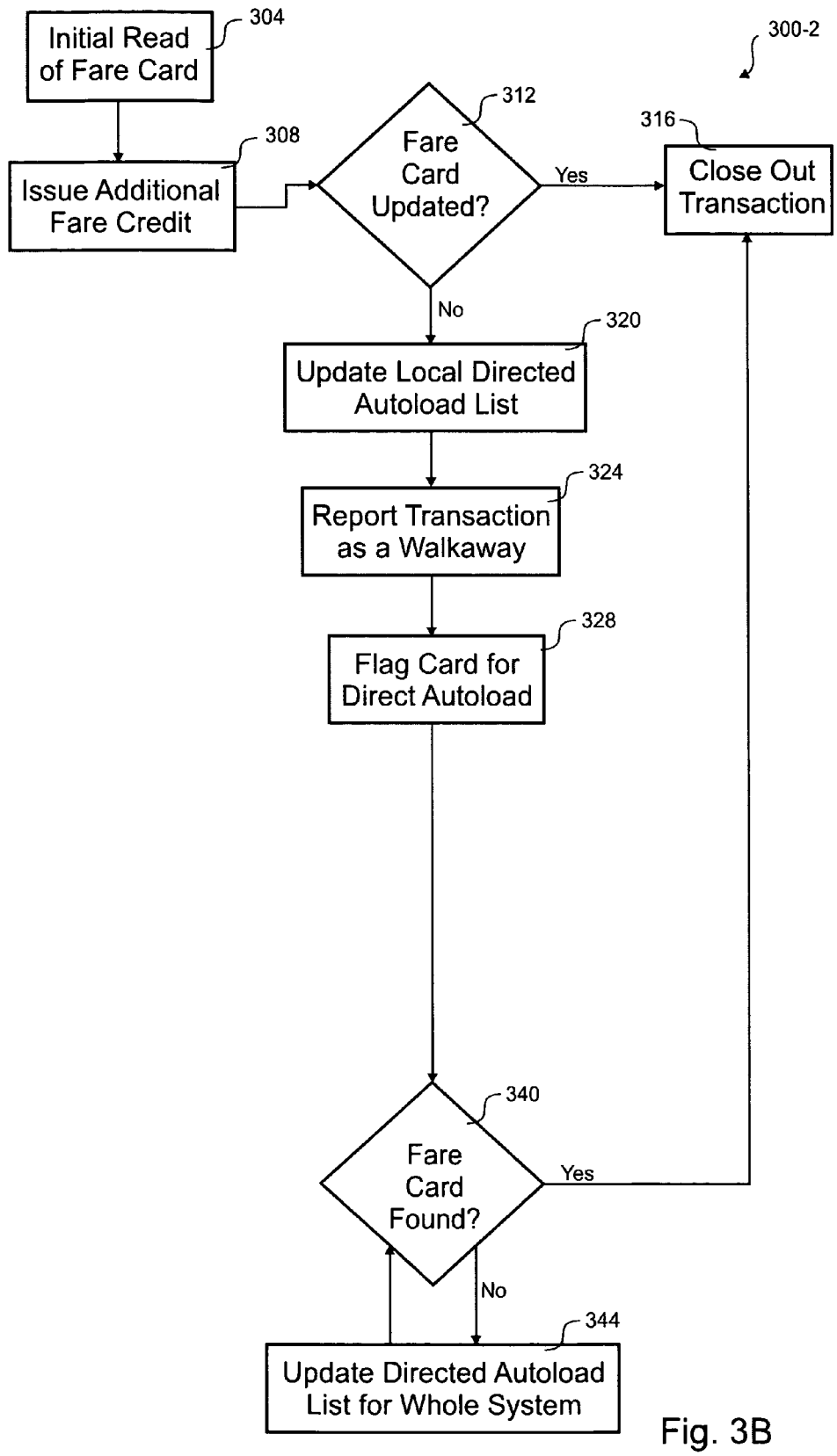

With reference to FIG. 3B, a flow diagrams of another embodiment of a process 300-2 for fixing an interrupted fare load is shown. This embodiment doesn't include steps 332 and 336 that are found in the embodiment of FIG. 3A. Processing goes from step 328 to step 340 such that a system-wide check for the fare card begins without first checking commonly used machines 208, 212 for a period of time. Other embodiments could have many different levels of dissemination of the directed autoload entry that are staged to occur after selectable time periods expire. By staging distribution of the directed autoload entry, these embodiments can decrease the size of directed autoload lists maintained by each machine 208, 212.

Figure 3C:
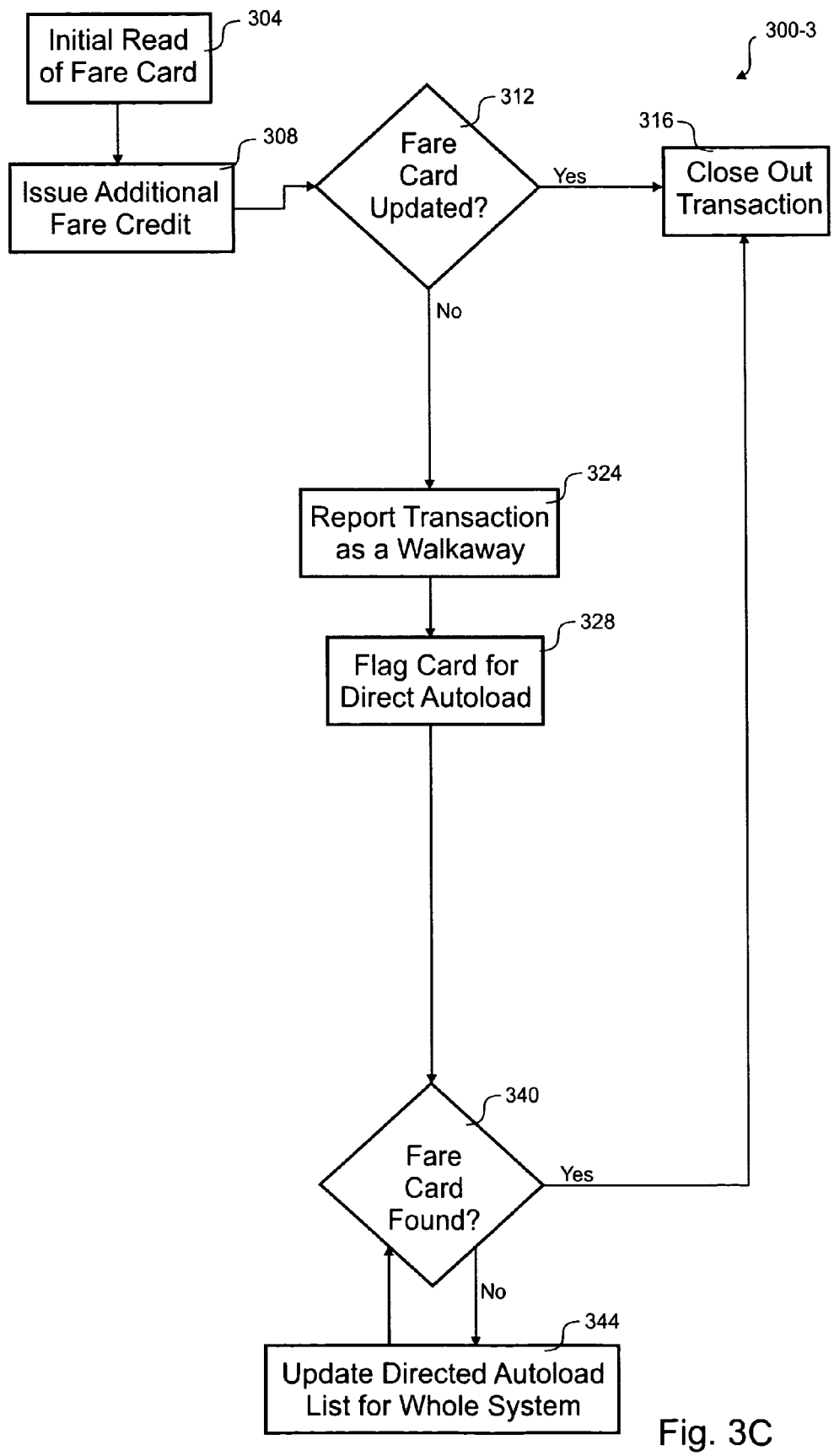

Referring next to FIG. 3C, a flow diagrams of yet another embodiment of a process 300-3 for fixing an interrupted fare load is shown. This embodiment differs from the embodiment of FIG. 3B in that step 320 is avoided. Processing goes from step 312 to step 324 to avoid updating the local directed autoload list for the machine 208, 212 that first detected the walkaway situation. The central control system 102 would disseminate an updated directed autoload list to the machine 208, 212 at a later stage in this embodiment.

Figure 3D:
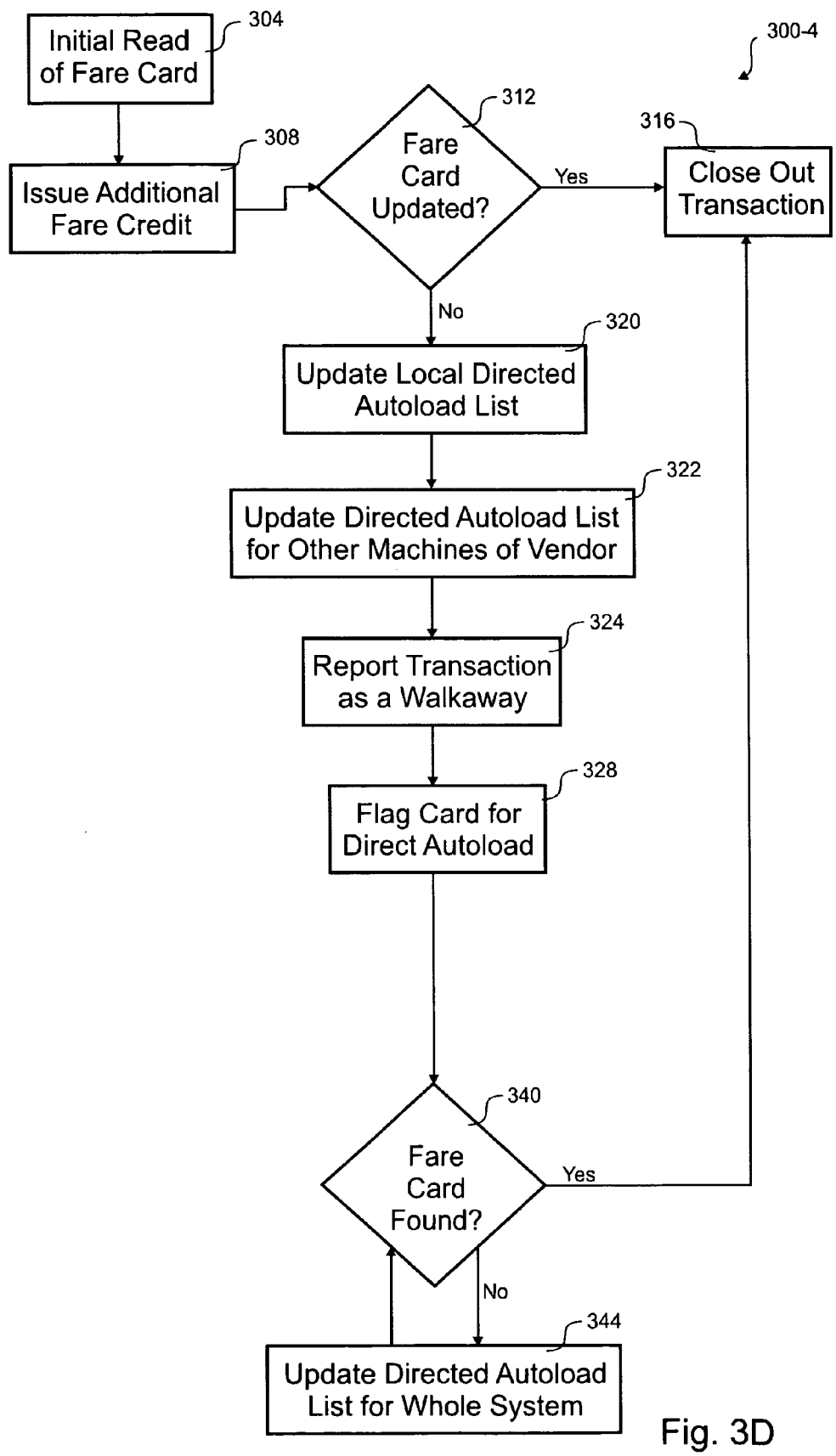

Referring next to FIG. 3D, a flow diagrams of still another embodiment of a process 300-4 for fixing an interrupted fare load is shown. This embodiment differs from the embodiment of FIG. 3B in that step 322 is inserted between steps 320 and 324. After the issuing TVM 212 updates the local directed autoload list in step 320, all TVMs 212 associated with a particular vendor, station or some other subset have their directed autoload list updated in step 322. There could be a delay between step 320 and 322 to give time for the user to go back to the original machine where the walkaway occurred.

Figure 4:
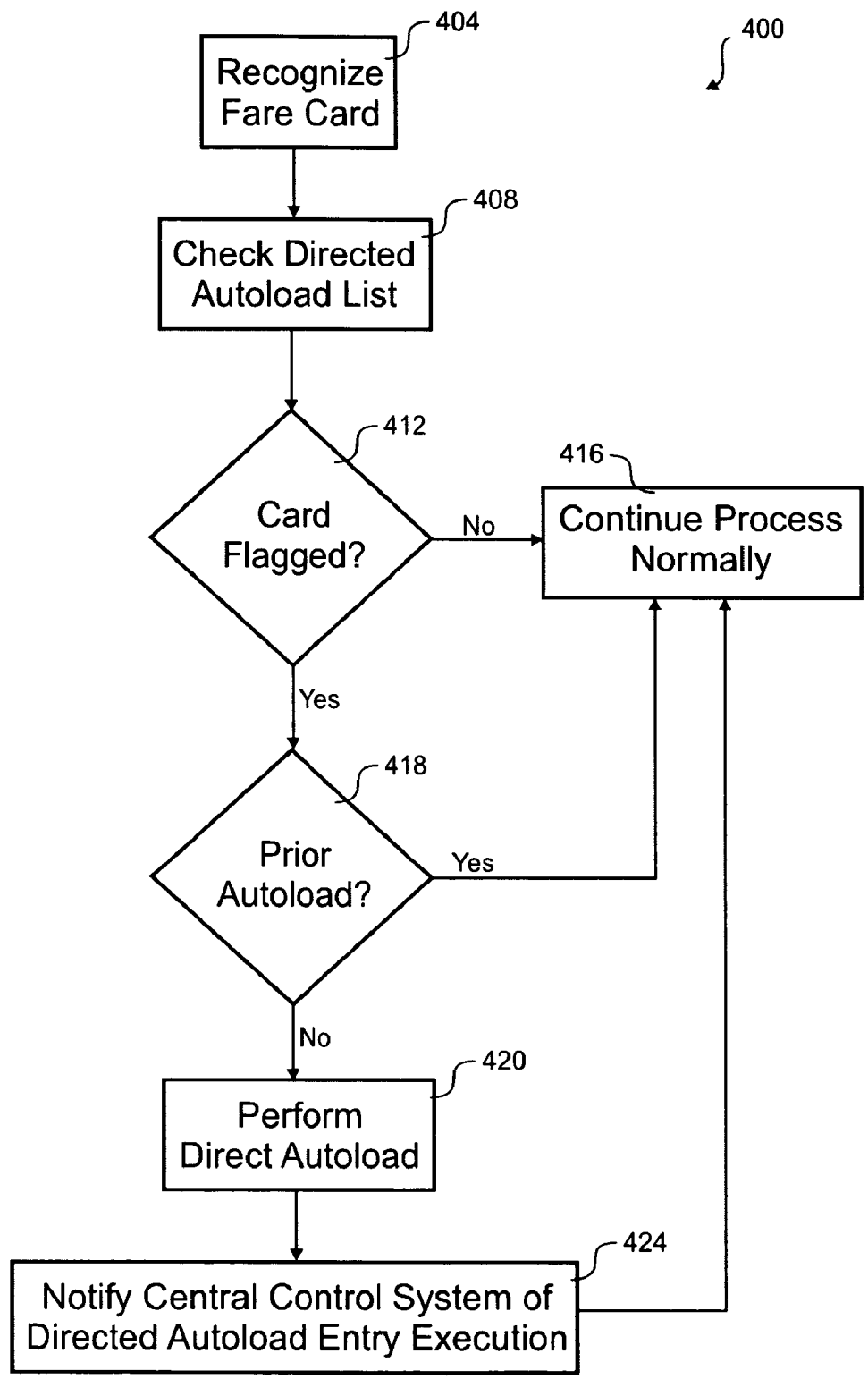
FIG. 4 is a flow diagram of an embodiment of a process loading a fare card with a direct autoload.

With reference to FIG. 4, a flow diagram of an embodiment of a process 400 loading a fare card with a direct autoload is shown. The depicted portion of the process begins in step 404 where the machine 208, 212 recognizes the fare card. In an embodiment that uses a contactless smart card, the user waives the fare card near a reader/writer such that the serial number can be read. In step 408, the directed autoload list is checked to determine if the fare card is flagged. For this embodiment, the machine 208, 212 has a directed autoload list stored locally, but other embodiments could refer to a remote directed autoload list stored elsewhere in the station system 112 or at the central control system 102.

Step 412 determines if the fare card serial number is flagged. Where the fare card is not referenced on the directed autoload list, processing continues from step 412 to step 416 where the process initiated with the machine 208, 212 progresses normally without any directed autoload. Where the fare card is flagged in step 412, processing continues to step 418 where the fare card is checked to see if another machine 208, 212 has already performed the directed autoload. A field in the fare card could be written when a directed autoload is performed to indicate that the directed autoload entry has already been executed. Other embodiments could surmise the directed autoload entry has been executed by analysis of the value stored in the card or by reviewing any transaction history that might be stored on the card.

Where the directed autoload had occurred with another machine 208, 212, processing continues to step 416 where the process initiated on the machine 208, 212 completes without any directed autoload. If it is determined in step 418 that there was no prior directed autoload executed in step 418, processing continues to step 420 where the directed autoload occurs. This load of credit or debit may be done as part of the other process initiated with the machine 208, 212 or could be separate. Screen prompts may request that the user waive the fare card near the reader/writer to allow writing the credit or debit. Processing continues to step 416 where the process is completed for both the autoload and the other process. For example, the user may use their fare card with a turnstile for entry into the transit system, which would be accomplished along with writing a credit left at a TVM 212 previously used.

A number of variations and modifications of the disclosed embodiments can also be used. For example, many of the above embodiments are explained in the context of a fare collection system, but the invention could be applied to any open or closed stored value system where the portable card or device stores an authenticated credit or debit value. Examples of other applications could include, prepaid phone cards, stored value credit cards, smart cards, cellular phones with an integral payment option, RFID tag with memory used for payment, etc.

While the principles of the disclosure have been described above in connection with specific apparatuses and methods, it is to be clearly understood that this description is made only by way of example and not as limitation on the scope of the invention.

What is claimed is:

1. A method for processing credit for a contactless stored value card associated with a transportation system, the method comprising:
    uniquely recognizing the contactless stored value card at a ticket vending machine, wherein the contactless stored value card comprises a semiconductor chip;
    receiving compensation from a user, wherein the compensation is for a credit, wherein the credit comprises:
        a monetary amount,
        an amount of usage, and/or
        a period where usage is available;
    determining with the ticket vending machine that the credit was not properly recorded to increase the stored value on the contactless stored value card;
    reporting to a central control system of the transportation system from the ticket vending machine that the credit was not loaded to the contactless stored value card;
    determining with a processor of the transportation system a plurality of locations, which is a subset of possible locations that can load the credit to the contactless stored value card;
    sending from the central control system to the plurality of locations an indication that the contactless stored value card should be loaded with the credit, wherein:
        a location is part of the plurality of locations, and
        each of the plurality of locations comprises a contactless stored value card writer configured to automatically load credits to the contactless stored value card;
    increasing the plurality of locations to include additional possible locations should the contactless stored value card not be encountered after a predetermined period of time;
    receiving at the location of the transportation system an indication that the credit should be loaded if the contactless stored value card is encountered at the location, wherein:
        the ticket vending machine is a crediting location and the location is an access point of the transportation system; and
        the contactless stored value card is configured to record the credit that affects any stored value associated with the contactless stored value card;
    uniquely recognizing the contactless stored value card at the location, wherein:
        the contactless stored value card stores information securely, and
        the information includes the credit;
    automatically loading the credit onto the contactless stored value card at the location, wherein:
        the stored value of the contactless stored value card increases due to the automatically loading, and
        the automatically loading the credit is performed offline without querying the central control system;
    determining if the credit was previously loaded onto the contactless stored value card; and
    avoiding the automatically loading of the credit based upon the outcome from the determining if the credit was previously loaded.

2. A method for processing credit for a contactless stored value card associated with a transportation system, the method comprising:
    uniquely recognizing the contactless stored value card at a ticket vending machine;
    receiving compensation from a user for the contactless stored value card, wherein:
        the compensation is for a credit,
        the contactless stored value card is configured to record the credit with the contactless stored value card, and
        the credit augments any stored value associated with the contactless stored value card;
    determining with the ticket vending machine that the credit was not properly recorded to affect the stored value on the contactless stored value card; and
    reporting to a node corresponding to a location of the transportation system that the credit failed to load at the ticket vending machine by adding the contactless stored value card to a directed autoload list, wherein the location can automatically load the credit with a contactless stored value card writer if the contactless stored value card is encountered at the location by reference to the directed autoload list.

3. The method for processing credit for the contactless stored value card as recited in claim 2, further comprising:

receiving at the location an indication that the credit should be loaded if the contactless stored value card is encountered at the location;

uniquely recognizing the contactless stored value card at the location; and automatically loading the credit onto the contactless stored value card at the location, wherein the stored value of the contactless stored value card increases due to the automatically loading the credit.

4. The method for processing credit for the contactless stored value card as recited in claim 2, wherein the contactless stored value card stores at least of:

a monetary credit, a usage amount, or a usage period.

5. The method for processing credit for the contactless stored value card as recited in claim 2, wherein the contactless stored value card comprises a semiconductor chip.

6. The method for processing credit for the contactless stored value card as recited in claim 2, wherein the reporting to a location comprises reporting that the credit failed to load to a central location, wherein the central location automatically reports that the credit failed to load to the location.

7. The method for processing credit for the contactless stored value card as recited in claim 2, wherein the credit is a negative amount, whereby the stored value would normally be decreased.

8. The method for processing credit for the contactless stored value card as recited in claim 2, wherein:

the contactless stored value card stores information securely, and the information includes the credit.

9. A computer-readable medium having computer-executable instructions that when executed by a computer performs the steps of:

uniquely recognizing the contactless stored value card at a ticket vending machine;

receiving compensation from a user for the contactless stored value card, wherein:

the compensation is for a credit, the contactless stored value card is configured to record the credit with the contactless stored value card, and the credit augments any stored value associated with the contactless stored value card;

determining with the ticket vending machine that the credit was not properly recorded to affect the stored value on the contactless stored value card at the ticket vending machine of the transportation system; and reporting to a node corresponding to a location of the transportation system that the credit failed to load at the ticket vending machine by adding the contactless stored value card to a directed autoload list, wherein a contactless stored value card writer associated with the location can automatically load the credit if the contactless stored value card is encountered at the location by reference to the directed autoload list.

10. A method for processing credit for a stored value card of a transportation system, the method comprising:

uniquely recognizing the stored value card at a ticket vending machine of the transportation system;

receiving notice at the ticket vending machine that a credit or a debit is destined for the stored value card, wherein the stored value card is configured to record the credit or debit that affects a stored value associated with the stored value card;

determining with the ticket vending machine that the credit or debit was not properly recorded to affect the stored value on the stored value card;

selecting a plurality of locations that is a subset of a larger set of locations;

reporting to the plurality of locations of the transportation system that the credit or debit failed to load, wherein:

the plurality of locations comprises a location, and the location is away from the ticket vending machine;

receiving at a node corresponding to the location an indication that the credit or debit should be loaded if the stored value card is encountered at the location;

uniquely recognizing the stored value card at the location; and automatically loading the credit or debit onto the stored value card at the location using a contactless stored value writer, wherein the stored value of the stored value card is affected by the automatically loading the credit.

11. The method for processing credit for the stored value card as recited in claim 10, wherein the stored value card comprises a semiconductor chip.

12. The method for processing credit for the stored value card as recited in claim 10, wherein the stored value card is contactless.

13. The method for processing credit for the stored value card as recited in claim 10, wherein the stored value includes at least one of the following:

a monetary amount, an amount of usage, and/or a period where usage is available.

14. The method for processing credit for the stored value card as recited in claim 10, wherein:

the stored value card can hold the stored value securely, and the stored value of the stored value card can be modified without first referring to a remote location.

15. The method for processing credit for the stored value card as recited in claim 10, further comprising disseminating the indication to a subset of machines that can affect the stored value of the stored value card.

16. The method for processing credit for the stored value card as recited in claim 10, further comprising disseminating the indication to commonly-used machines that can affect the stored value of the stored value card, wherein the commonly-used machines are determined based upon usage of the stored value card.

17. The method for processing credit for the stored value card as recited in claim 10, wherein:

the stored value card stores information securely, and the information includes the credit.

18. The method for processing credit for the stored value card as recited in claim 10, further comprising:

determining that the credit or debit was not loaded within a predetermined time period; and reporting to more of the larger set of locations that the credit or debit failed to load when it is determined that the credit or debit was not loaded within the predetermined time period.

19. A method for processing credit for a contactless stored value card associated with a transportation system, the method comprising:

determining with a ticket vending machine that a credit to the contactless stored value card was not properly loaded at the ticket vending machine, wherein the contactless stored value card is configured to record the credit that affects any stored value associated with the contactless stored value card;

reporting to a central control system of the transportation system from the ticket vending machine that the credit was not loaded to the contactless stored value card;

determining with a processor within the transportation system a plurality of locations, which is a subset of a larger set of possible locations that can load the credit to the contactless stored value card;

sending from the central control system to the plurality of locations an indication that the contactless stored value card should be loaded with the credit, wherein a location is part of the plurality of locations;

receiving at a node corresponding to the location of the transportation system an indication that the credit should be loaded if the contactless stored value card is encountered at the location;

uniquely recognizing the contactless stored value card at the location; and automatically loading the credit onto the contactless stored value card at the location with a contactless stored value writer, wherein the stored value of the contactless stored value card increases due to the automatically loading the credit.

20. The method for processing credit for the contactless stored value card as recited in claim 19, further comprising:

uniquely recognizing the contactless stored value card at the ticket vending machine; and receiving compensation from a user, wherein the compensation is for the credit.

21. The method for processing credit for the contactless stored value card as recited in claim 19, wherein the contactless stored value card comprises a semiconductor chip.

22. The method for processing credit for the contactless stored value card as recited in claim 19, wherein the credit comprises:

a monetary amount, an amount of usage, and/or a period where usage is available.

23. The method for processing credit for the contactless stored value card as recited in claim 19, further comprising:

determining if the credit was previously loaded onto the contactless stored value card; and avoiding the automatically loading of the credit based upon the outcome from the determining if the credit was previously loaded.

24. The method for processing credit for the contactless stored value card as recited in claim 19, wherein:

the contactless stored value card stores information securely, and the information includes the credit.

25. The method for processing credit for the contactless stored value card as recited in claim 19, wherein the automatically loading is done offline without querying the central control system.

* * * * *